US008600722B1

(12) United States Patent
Chan et al.

(10) Patent No.: US 8,600,722 B1
(45) Date of Patent: Dec. 3, 2013

(54) METHOD AND APPARATUS FOR PROVIDING PROGRAM-BASED HARDWARE CO-SIMULATION OF A CIRCUIT DESIGN

(75) Inventors: Chi Bun Chan, San Jose, CA (US); Nabeel Shirazi, San Jose, CA (US); Shay Ping Seng, San Jose, CA (US); Haibing Ma, Superior, CO (US)

(73) Assignee: Xilinx, Inc., San Jose, CA (US)

( * ) Notice: Subject to any disclaimer, the term of this patent is extended or adjusted under 35 U.S.C. 154(b) by 961 days.

(21) Appl. No.: 11/805,133

(22) Filed: May 22, 2007

(51) Int. Cl.
*G06F 17/50* (2006.01)

(52) U.S. Cl.
USPC .......................................................... 703/14

(58) Field of Classification Search
USPC .................... 716/16, 116; 703/14, 13
See application file for complete search history.

(56) References Cited

U.S. PATENT DOCUMENTS

| | | | | |
|---|---|---|---|---|
| 6,438,738 | B1 * | 8/2002 | Elayda ........................ | 716/117 |
| 7,194,705 | B1 * | 3/2007 | Deepak et al. ................. | 716/3 |
| 7,203,632 | B2 * | 4/2007 | Milne et al. ................... | 703/14 |
| 7,346,481 | B1 * | 3/2008 | Ballagh et al. ................ | 703/14 |
| 7,437,280 | B1 * | 10/2008 | Ballagh et al. ................ | 703/14 |
| 2002/0067757 | A1 * | 6/2002 | Philips et al. ................. | 375/130 |
| 2002/0152456 | A1 * | 10/2002 | Nightingale et al. ........ | 717/135 |
| 2003/0225561 | A1 * | 12/2003 | Garcia et al. .................. | 703/17 |

OTHER PUBLICATIONS

Coumeri, An Environment for Hardware-Software Cosimulation, 1995, Carnegie Mellon Department of Electrical and Computer Engineering, pp. 1-47.*
Thomas et al., A model and Methodology for Hardware-Software Codesign, Sep. 1993, IEEE, pp. 6-15.*
Kudlugi et al., A Transaction-Based Unified Simulation/Emulation Architecture for Functional Verification, Jun. 2001, ACM, pp. 1-6.*
Gelinas et al., LEAH: An Introduction to Behavioral Abstraction and Co-Simulation Using Perl and Verilog, 1996, IEEE, pp. 81-88.*

* cited by examiner

*Primary Examiner* — Omar Fernandez Rivas
*Assistant Examiner* — Bernard E Cothran
(74) *Attorney, Agent, or Firm* — Robert M. Brush; LeRoy D. Maunu; Lois D. Cartier

(57) ABSTRACT

A method and apparatus for providing a program-based hardware co-simulation of a circuit design are described. In one example, a circuit design is implemented for programmable logic to establish a design under test (DUT). A co-simulation model is programmatically generated using primitives defined by an application programming interface (API). The circuit design is simulated by configuring the programmable logic with the DUT and driving a co-simulation engine to communicate with the DUT via execution of the co-simulation model.

17 Claims, 3 Drawing Sheets

METHOD AND APPARATUS FOR PROVIDING PROGRAM-BASED HARDWARE CO-SIMULATION OF A CIRCUIT DESIGN

FIELD OF THE INVENTION

One or more aspects of the present invention relate generally to simulation of circuit designs and, more particularly, to a method and apparatus for providing program-based hardware co-simulation of a circuit design.

BACKGROUND

Electronic design automation (EDA) systems provide software tools in which electronic circuit designs can be described, simulated, and translated by machine into a design realization. A conventional mechanism for describing a circuit design is hardware description language (HDL). A user defines a behavioral description of a design using HDL and the HDL design is processed to generate a physical implementation. HDL design tools include HDL simulation environments, such as the ModelSim environment from the Model Technology Company, and implementation environments, such as Synplify from Synplicity, Inc. Another type of circuit design system, referred to as a high level modeling system (HLMS), provides a higher level of abstraction for describing and simulating an electronic circuit than does an HDL simulation environment or implementation environment. An HLMS generally provides a mathematical representation of signals as compared to standard logic vectors in an HDL. It is desirable for the high-level abstractions to be precisely correlated with the ultimate implementation representation, both in simulation semantics and in implementation. The Xilinx System Generator for DSP and the MathWorks' Simulink and MATLAB environments are example HLMS's in which such capabilities are desirable.

A design implemented in an HLMS is typically simulated using software algorithms that model the hardware behavior of the blocks that comprise the model. Sometimes it is beneficial to use hardware, in addition to software, during a simulation. Using hardware in the simulation loop can accelerate simulation speeds dramatically, while also providing real-time hardware verification capabilities. The process of breaking a design into pieces and simulating those pieces using subsidiary design tools is referred to as "co-simulation." When the subsidiary tool of interest is a reconfigurable hardware platform, the process is referred to as "hardware co-simulation."

In hardware co-simulation, the simulation of a design under test (DUT) is offloaded to hardware. The host simulation environment (software) passes stimuli to the input ports of the DUT running on hardware via a communication interface. Similarly, the communication interface captures results from the output ports of the DUT and then reads the results back to the host simulation environment.

In particular, a design modeled in an HLMS is first compiled for a hardware co-simulation platform, during which a hardware implementation of the design is generated. The hardware co-simulation platform may include reconfigurable hardware, such as a field programmable gate array (FPGA) or other type of programmable logic device (PLD). In such case, the hardware implementation comprises a configuration bitstream. In the HLMS, the hardware implementation is associated with a co-simulation block, which is inserted into the model. The model is then simulated while the compiled design is actually executed on the hardware platform. The co-simulation block is essentially a front-end interface that fits into the HLMS framework, which imposes the form of blocks and diagrams on the co-simulation block. Underneath the co-simulation block, a hardware co-simulation engine serves as the backend and handles the communication with the hardware platform transparently. The hardware co-simulation block forwards simulation data to the hardware and reads back results to the HLMS.

A graphical block diagram environment of an HLMS provides an appealing visualization of abstracted system designs. However, such an environment may not be a suitable interface for every application. For example, a block diagram environment may not be a favorable choice for users who are more comfortable writing program code, or for external programs that integrate with hardware co-simulation programmatically. Creating test benches in a block diagram environment can sometimes be overwhelming. Debugging a design in a block diagram environment may require more effort. Accordingly, there exists a need in the art for a method and apparatus for providing hardware co-simulation interface that overcomes the aforementioned deficiencies.

SUMMARY

A method and apparatus for providing a program-based hardware co-simulation of a circuit design are described. In one embodiment, a circuit design is implemented for programmable logic to establish a design under test (DUT). A co-simulation model is programmatically generated using primitives defined by an application programming interface (API). This approach allows the user an improved control over the functionality of the co-simulation model, because the user can programmatically control individual operations performed by the co-simulation model. The circuit design is simulated by configuring the programmable logic with the DUT and driving a co-simulation engine to communicate with the DUT via execution of the co-simulation model.

BRIEF DESCRIPTION OF THE DRAWINGS

Accompanying drawings show exemplary embodiments in accordance with one or more aspects of the invention. However, the accompanying drawings should not be taken to limit the invention to the embodiments shown, but are for explanation and understanding only.

DETAILED DESCRIPTION OF THE DRAWINGS

Figure 1:
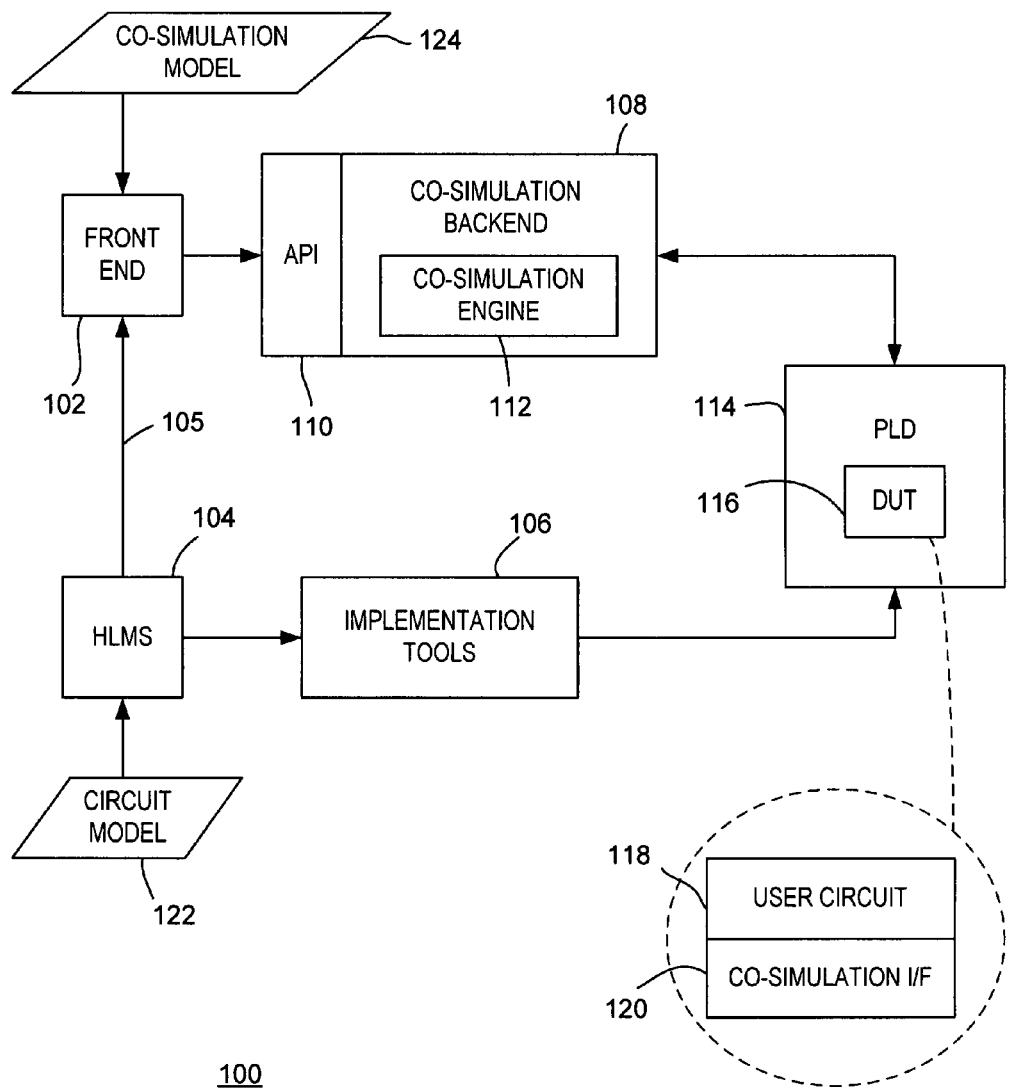
FIG. 1 is a block diagram depicting an exemplary embodiment of an electronic design automation (EDA) system in accordance with one or more aspects of the invention.

FIG. 1 is a block diagram depicting an exemplary embodiment of an electronic design automation (EDA) system 100 in accordance with one or more aspects of the invention. The system 100 includes a co-simulation front end ("front end 102"), a high level modeling system (HLMS) 104, implementation tools 106, a co-simulation backend 108, and a programmable logic device (PLD) 114. The HLMS 104 is configured to receive a circuit model 122. The circuit model 122 is an electronic representation or model of a circuit design. The HLMS 104 captures the circuit model 122 in response to schematic or logic level input by a circuit designer. The circuit model 122 may be schematically represented on a graphical user interface (GUI). In some embodiments, the circuit model 122 is an abstraction of a circuit design that includes "blocks", "ports", and "nets". Blocks, or logic blocks, represent sections, having circuit elements, of the circuit design. Ports represent inputs and outputs of blocks. Nets, or networks, represent connections between various ports of various blocks. The blocks, ports, and nets of the circuit model represent an abstraction of the circuit design in a well-known manner.

For example, blocks, ports, and nets are abstractions that may be produced by System Generator for DSP, commercially available from Xilinx, Inc., or other known abstraction translators. As understood by those skilled in the art, however, circuit design systems may employ other types of abstractions to represent a circuit design in addition to, or in place of, the above-described blocks, ports, and nets. In general, the circuit model 122 captured by the HLMS 104 includes a plurality of circuit descriptions that represent the behavior of circuit elements. In addition, while an HLMS is described as an example, those skilled in the art will appreciate that other types of design platforms may be utilized with the invention, such as hardware description language (HDL) platforms, instead of or in addition to an HLMS.

The circuit model 122 as captured by the HLMS 104 is provided to the implementation tools 106. The implementation tools 106 comprise various tools for physically implementing the circuit model 122. The physical implementation typically comprises a configuration bitstream to be loaded into the PLD 114, such as a field programmable gate array (FPGA). An FPGA is a well-known integrated circuit (IC) capable of implementing user-defined circuits using programmable logic. Implementation tools for an FPGA may include, for example, a synthesis tool for producing a logical or gate-level netlist from an HDL description, a map tool for mapping the netlist onto FPGA resources, a place-and-route (PAR) tool for placing the mapped resources and routing connections between them, and a bitstream generator for generating a configuration bitstream. Such FPGA implementation tools are well known in the art and are omitted from FIG. 1 for clarity.

The physical implementation produced by the implementation tools 106 configures the PLD 114 to establish the design under test (DUT) 116. The DUT 116 includes a user circuit 118 (i.e., the circuit corresponding to the circuit model 122) and co-simulation interface circuitry 120. The co-simulation interface circuitry 120 is added to the circuit model 122 by the HLMS 104 and provides a communication interface between the user circuit 118 and the co-simulation backend 108. The process of adding the co-simulation interface circuitry 120 is typically transparent to the user.

The co-simulation backend 108 is configured to drive the PLD 114 for simulation of the DUT 116. The co-simulation backend 108 comprises the software portion of the co-simulation environment and passes stimuli to the input ports of the DUT 116 running on the PLD 114 (hardware). Similarly, the co-simulation backend 108 captures results from the output ports of the DUT 116. The co-simulation backend 108 includes a co-simulation engine 112 for handling communication between the backend 108 and the co-simulation interface circuitry 120 of the DUT 116 in the PLD 114. In particular, the co-simulation engine 112 forwards simulation stimulus data to the DUT 116 and receives result data back from the DUT 116. The co-simulation engine 112 also controls the clocking of the DUT by, for example, pulsing the DUT for a given number of clock cycles synchronously with the software simulation model, or letting the DUT operate in an asynchronous free-running mode.

The front end 102 drives the co-simulation backend 108, in particular the co-simulation engine 112, via the application programming interface (API) 110. The API 110 allows a user to perform co-simulation in an instruction-centric fashion. The front end 102 also receives data from the HLMS 104, such as metadata 105 for the circuit model 122. The metadata 105 may include information that describes the design, such as the name, data type, and sample period of each port in the design. The front end 102 may comprise a scripting interface or the like for processing co-simulation model 124 and the metadata 105 to perform the co-simulation. The co-simulation model 124 is defined programmatically using the API 110. Notably, the co-simulation model 124 includes an arrangement of primitives defined in the API 110 that allow interaction with the DUT 116 running on the PLD 114. The primitives are used within the context of the design-specific information provided by the metadata 105. The API 110 allows users to construct simulations independent of the HLMS 104. The API 110 also maintains an appropriate degree of abstraction and transparency by encapsulating the details of co-simulation and communication interfaces between the co-simulation engine 112 and the co-simulation interface circuitry 120.

In some embodiments, the front end 102 comprises a MATLAB scripting interface. In such embodiments, the API 110 is based on the M-Code scripting language provided as part of the MATLAB environment. While the MATLAB scripting environment and the M-Code scripting language are described as specific examples, those skilled in the art will appreciate that the invention may employ other types of programmatic interfaces that employ various languages, including various well known compiled languages, interpreted languages, or the like.

The API 110 provides the concepts of ports, shared memories, and data representations for use in establishing an instance of co-simulation. The circuit model 122 is designed to expose its top-level ports and embedded shared memories for external access via the co-simulation interface circuitry 120. In contrast to the block diagram approach to co-simulation provided by an HLMS, the API 110 provides lower level primitive operations for performing hardware co-simulation, such as reading or writing a port or single-stepping the clock. The API 110 does not enforce a rigid simulation flow or semantic, instead leaving such flow to the users to define. The co-simulation model 124 includes a sequence of co-simulation operations defined by the API 110. For example, the following sequence may be defined:

1. Create a hardware co-simulation instance for a particular design
2. Open the hardware co-simulation interface
3. Repeat the following steps until the simulation ends:
   a. Write simulation data to the input ports (i.e., input stimulus)
   b. Read results from the output ports
   c. Run the DUT 116 for one cycle (single-step clock)
4. Close the hardware co-simulation interface
5. Release the hardware co-simulation instance.

As described above, the API 110 defines a set of instructions (primitives) for interacting with the co-simulation engine 112. Different instructions are used to address different needs for flexibility and performance. The basic co-simulation instructions provide a complete coverage of the operations outlined in the above-described sequence for the co-simulation model 124. In some embodiments, advanced co-simulation and shared memory access instructions are provided to bolster simulation performance. Exemplary instructions include:

Instance Construction and Destruction
    create: Create a hardware co-simulation instance.
    release: Release a hardware co-simulation instance.

Basic Co-Simulation Operations
    open: Open a hardware co-simulation interface, which involves configuring and establishing the communication to the DUT 116 in the PLD 114 via the co-simulation interface circuitry 120.
    close: Close a hardware co-simulation interface.
    run: Single-step the clock of the DUT 116 for a given number of cycles.
    write: Write values to a single or to multiple input ports of the DUT 116.
    read: Read values from a single or from multiple output ports of the DUT 116.

Advanced Co-Simulation Operations
    InitExec: Initialize an execution definition. An execution definition defines what input and output ports are involved in subsequent executions associated therewith.
    exec: Execute an execution definition for a given number of clock cycles, which invokes a sequence of write, read, and run operations in that order.

Shared Memory Access
    createMem: Create a shared memory or register instance.
    releaseMem: Release a shared memory or register instance.
    writeMem: Write values to a shared memory or register.
    readMem: Read values from a shared memory or register.
    createFIFO: Create a shared first-in-first-out (FIFO) instance.
    releaseFIFO: Release a shared FIFO instance.
    writeFIFO: Write values to a shared FIFO.
    readFIFO: Read values from a shared FIFO.

Auxiliary Functions
    get: Get a property of a hardware co-simulation instance.
    set: Set a property of a hardware co-simulation instance.
    getMem: Get a property of a shared memory or register instance.
    setMem: Set a property of a shared memory or register instance.
    getFIFO: Get a property of a shared FIFO instance.
    setFIFO: Set a property of a shared FIFO instance.

Those skilled in the art will appreciate that the above instructions are merely exemplary and that the API 110 may include more instructions for effecting hardware co-simulation. In some embodiments, the API 110 uses fixed point data types internally, while it consumes and produces double precision floating point values to external entities. Data passing through a port or a memory location in a shared memory may be fixed point numbers. Each has a preset data width and an implicit binary point position that may be fixed at the compilation time. Data conversions (from double precision to fixed point) occur on the boundary of the API 110. Quantization of the input data may be handled by rounding and overflow may be handled by saturation. In some embodiments, the API 110 includes configurable policies for quantization and overflow handling. With appropriate data conversion schemes, the API 110 can also take other data types (e.g. complex numbers) and marshal data values into corresponding bit sequences implemented in hardware.

In the described embodiment, both the write and read instructions operate on single or multiple ports. A single port can be specified either by name or by index (as set forth in the metadata file 105). A port name is represented as a string in MATLAB. For example, 'we' and 'rst' may represent the write enable and reset ports of the DUT 116. A port index may be represented as a double precision floating point number. Multiple ports can be specified as an arbitrarily ordered sequence of indices. A sequence of M indices may be represented as a 1×M double array, with each entry being a port index. For example, [8 2 1 3:5] represents the ports with index 8, 2, 1, 3, 4, and 5 in that order. Multiple ports may also be specified by names using a 1×M cell array of strings. For example, {'we', 'rst', 'din'} may represent the write enable, reset, and data-in ports of a design in that order.

The exec instruction is designed to minimize the overhead inherited in the MATLAB environment. The exec instruction condenses a sequence of operations into a single instruction, and thus reduces the overhead when the M-Code is interpreted. The exec instruction can provide a significant performance improvement during simulation, as compared to using a repetitive sequence of individual write, read, and run instructions.

Shared memory access is similar to port access. Each shared memory instance (block RAM, FIFO, or register) is identified by a unique name. Reading or writing to a shared memory may involve a burst of data, which is exchanged between the co-simulation backend 108 and the PLD 114 in a single transaction. For example, the writeMem instruction may take a shared memory name, a sequence of addresses, and a sequence of data as arguments. The address and data sequences are in one-to-one correspondence, which indicate where in the memory each data value should be written. The writeFIFO instruction pushes a sequence of data into a shared memory, but without the need to specify addresses. The readMem and readFIFO instructions read a shared memory or FIFO in the similar fashion.

Figure 2:
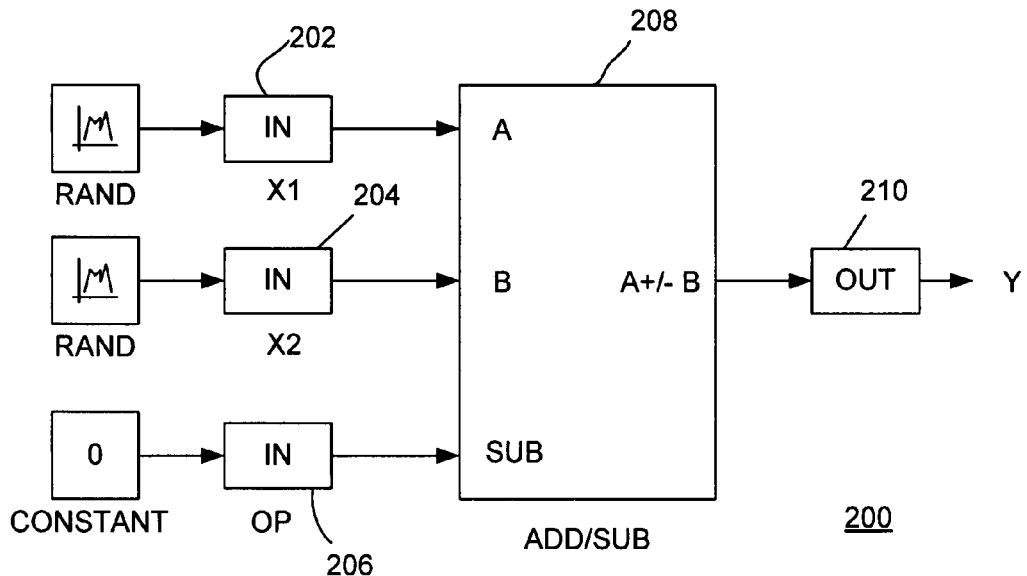
FIG. 2 is a block diagram depicting an exemplary embodiment of a circuit model configured for hardware co-simulation.

FIG. 2 is a block diagram depicting an exemplary embodiment of a circuit model 200 configured for hardware co-simulation. The circuit model 200 includes input ports 202, 204, and 206, an adder 208, and an output port 210. The input port 202 receives a random number of double precision, the input port 204 receives a random number of double precision, and the input port 206 receives a constant value of double precision. The input port 202 (designated 'x1') is coupled to an 'a' input of the adder 208. The input port 204 (designated 'x2') is coupled to a 'b' input of the adder 208. The input port 206 (designated 'op') is coupled to a 'sub' input of the adder 208. The 'sub' input determines whether the adder 208 adds 'a' and b' or subtracts 'b' from 'a'. The output port 210 (designated 'y') is coupled to a output port of the adder 208. The output port 210 provides a double precision output value.

In the circuit model 200, each of the ports 202, 204, 206, and 210 have the same period of one clock cycle. After the circuit model 200 is compiled for hardware co-simulation by the HLMS 104 and the implementation tools 106, a simulation model may be established using the API 110 and the circuit model 200 may be co-simulated in hardware. An exemplary co-simulation model established using the API 110 for the circuit model 200 is shown below:

% Define the number of simulation cycles
    nCycles=1000;
    Pre-allocate a buffer to hold the result
    result=zeros(1, nCycles);
    % Create a hardware co-simulation instance from metadata
    h=Hwcosim(metaInfo);

```
% Open and configure the hardware co-simulation inter-
   face
   open(h);
   Initialize the input port 'op' with a constant value zero
   h('op')=0;
   Simulate the design
   for i=1:nCycles
   % Writes a random number to each of the input ports x1 and
      x2
   h('x1')=rand;
   h('x2')=rand;
   % Read the current value of output port y into the result
      buffer
   result(i)=h('y');
   % Single-step the clock of the design to advance to the next
      cycle
   run(h);
   end
   % Release the hardware co-simulation instance
   % The hardware co-simulation interface is closed implic-
itly
   release(h);
```

Another exemplary co-simulation model established using the API 110 for the circuit model 200 is shown below:

```
   nCycles=1000;
   h=Hwcosim(design1_metainfo);
   open(h);
   write(h, 'op', 0);
   % Initialize an execution definition that covers the input
ports,
   % x1 and x2, and the current port y. Return an execution
   % identifier for use in subsequent exec instructions.
   execId=initExec(h, {'x1', 'x2'}, {'y'});
   % Simulate the design using the exec instruction.
   % The input data are given as a 2-D matrix. Each row of the
matrix
   % gives the simulation data of an input port for all the
cycles.
   % For example, row i, column j stores the data for the ith
port at
   % the (j−1)th cycle.
   Result=exec(h, execId, nCycles, rand(2, nCycles));
   release(h);
```

Figure 3:
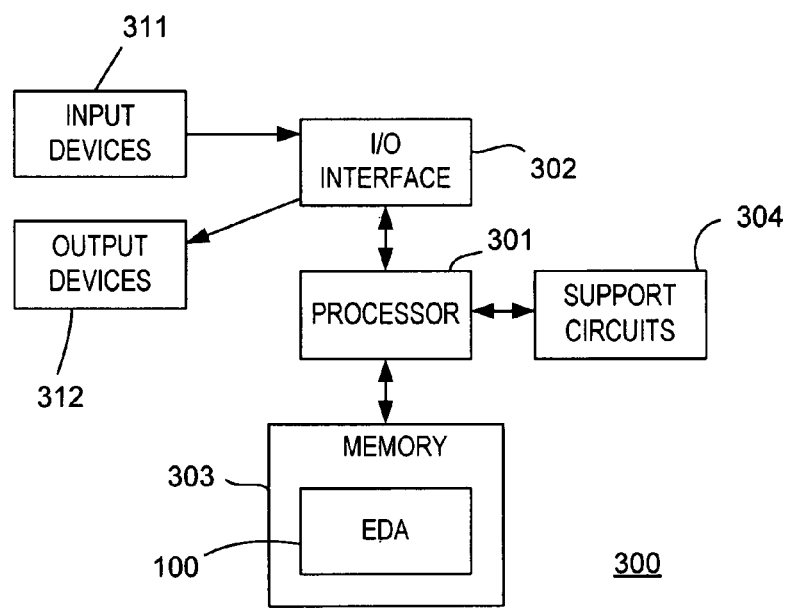
FIG. 3 is a block diagram depicting an exemplary embodiment of a computer suitable for implementing the processes described herein in accordance with one or more aspects of the invention.

FIG. 3 is a block diagram depicting an exemplary embodiment of a computer 300 suitable for implementing the processes described herein in accordance with one or more aspects of the invention. The computer 300 includes a processor 301, a memory 303, various support circuits 304, and an I/O interface 302. The processor 301 may include one or more microprocessors known in the art. The support circuits 304 for the processor 301 may include conventional cache, power supplies, clock circuits, data registers, I/O interfaces, and the like. The I/O interface 302 may be directly coupled to the memory 303 or coupled through the processor 301. The I/O interface 302 is coupled to various input devices 311 (e.g., keyboard, mouse, and the like) and output devices 312 (e.g., display, printer, and the like).

The memory 303 stores processor-executable instructions and/or data that may be executed by and/or used by the processor 301. These processor-executable instructions may comprise hardware, firmware, software, and the like, or some combination thereof. Modules having processor-executable instructions that are stored in the memory 303 include EDA system 100 (see FIG. 1). The computer 300 may be programmed with an operating system, which may be JAVA™ virtual machine, LINUX®, SOLARIS™, UNIX®, WINDOWS®, WINDOWS95®, WINDOWS98®, WINDOWS NT®, and WINDOWS2000®, WINDOWSME®, AND WINDOWSXP®, among other known platforms. At least a portion of an operating system may be disposed in the memory 303. The memory 303 may include one or more of the following: random access memory, read only memory, magneto-resistive read/write memory, optical read/write memory, cache memory, magnetic read/write memory, and the like, as well as signal-bearing media as described below.

Figure 4:
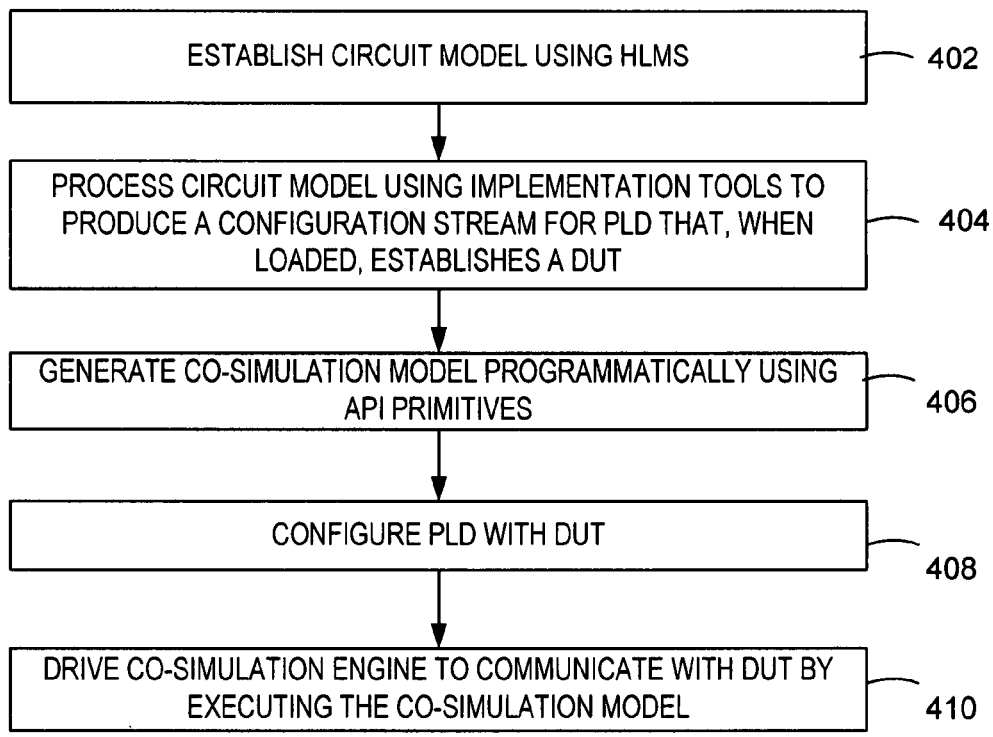
FIG. 4 is a flow diagram depicting an exemplary embodiment of a method for hardware co-simulation of a circuit design in accordance with one or more aspects of the invention.

FIG. 4 is a flow diagram depicting an exemplary embodiment of a method 400 for hardware co-simulation of a circuit design in accordance with one or more aspects of the invention. The method 400 begins at step 402, where a circuit model is established. In some embodiments, the circuit model may be established using a high level modeling system. At step 404, the circuit model is processed using implementation tools to produce a configuration stream for a PLD that, when loaded, establishes a DUT. At step 406, a co-simulation model is generated programmatically using primitives defined by an API. At step 408, the PLD is configured with the DUT. At step 410, a co-simulation engine is driven to communicate with the DUT by executing the co-simulation model. The co-simulation engine outputs results of the simulation, e.g., by storing results in a computer file, displaying the results, passing the results to another computer program, or by some other means.

While the foregoing describes exemplary embodiments in accordance with one or more aspects of the present invention, other and further embodiments in accordance with the one or more aspects of the present invention may be devised without departing from the scope thereof, which is determined by the claims that follow and equivalents thereof. Claims listing steps do not imply any order of the steps. Trademarks are the property of their respective owners.

What is claimed is:

1. A method of hardware co-simulation of a circuit design, comprising:
   implementing the circuit design for programmable logic to establish a design under test (DUT);
   executing a user-specified sequence of scripting instructions with a scripting interface, each scripting instruction defined by an application programming interface (API);
   wherein at least one of the scripting instructions in the sequence specifies a write function, references a port of the DUT, and specifies a value to write to the port;
   wherein at least one of the scripting instructions in the sequence specifies a number of clock cycles for running the DUT;
   wherein the sequence of scripting instructions includes respective scripting instructions that specify:
      creating a shared memory instance;
      writing a value to the shared memory instance;
      reading a value from the shared memory instance; and
      releasing the shared memory instance;
   simulating the circuit design by configuring the programmable logic with the DUT and driving a co-simulation engine to communicate with the DUT via execution of the sequence of scripting instructions that write to the port of the DUT and that read from and write to the shared memory instance; and
   outputting results of simulating the circuit design.

2. The method of claim 1, wherein the implementing comprises:
   establishing a model of the circuit design using a high level modeling system (HLMS); and processing the model of the circuit design using a plurality of implementation tools for the programmable logic to generate a configuration stream for the DUT.

3. The method of claim 2, wherein the sequence of scripting instructions accesses the API using an interface independent of the HLMS.

4. The method of claim 2, wherein the sequence of scripting instructions is programmatically generated within the context of metadata generated by the HLMS.

5. The method of claim 1, wherein the sequence of scripting instructions includes respective instructions for:
   creating a hardware co-simulation instance;
   opening a hardware co-simulation interface; and
   communicating data between the co-simulation engine and the DUT in the programmable logic.

6. The method of claim 1, wherein the sequence of scripting instructions further includes an instruction that specifies a read operation and a port from which to read a value.

7. An apparatus for hardware co-simulation of a circuit design, comprising:
   a computer configured to implement a co-simulation backend and a co-simulation front end;
   the co-simulation backend having a co-simulation engine and an application programming interface (API); and
   the co-simulation front end including a scripting interface configured to execute a user-specified sequence of scripting instructions, each instruction defined by the API to drive the co-simulation engine to communicate with a design under test (DUT) to effect simulation of the DUT;
   wherein at least one of the scripting instructions in the sequence specifies a number of clock cycles for running the DUT;
   wherein at least one of the scripting instructions in the sequence specifies a write function, references a port of the DUT, and specifies a value to write to the port; and
   wherein the sequence of scripting instructions includes respective instructions that specify:
   creating a shared memory instance;
   writing a value to the shared memory instance for communication to the DUT;
   reading a value from the shared memory instance as communicated from the DUT; and
   releasing the shared memory instance.

8. The apparatus of claim 7, further comprising:
   a high level modeling system (HLMS) configured to define a circuit model; and
   implementation tools configured to produce a physical implementation of the circuit model, the physical implementation being configured to establish the DUT in programmable logic.

9. The apparatus of claim 8, wherein the DUT includes a user circuit associated with the circuit model and co-simulation interface circuitry configured to communicate with the co-simulation engine.

10. The apparatus of claim 8, wherein the front end comprises an interface independent of the HLMS.

11. The apparatus of claim 8, wherein the co-simulation front end is configured to receive metadata from the HLMS associated with the circuit model, the sequence of scripting instructions being defined within the context of the metadata.

12. The apparatus of claim 7, further comprising:
   programmable logic coupled to the computer having the DUT configured therein.

13. An apparatus for hardware co-simulation of a circuit design, comprising:
   means for implementing the circuit design for programmable logic to establish a design under test (DUT);
   means for executing a user-specified sequence of scripting instructions with a scripting interface, each scripting instruction defined by an application programming interface (API);
   wherein at least one of the scripting instructions in the sequence specifies a number of clock cycles for running the DUT;
   wherein at least one of the scripting instructions in the sequence specifies a write function, references a port of the DUT, and specifies a value to write to the port;
   wherein the sequence of scripting instructions includes respective instructions that specify:
   creating a shared memory instance;
   writing a value to the shared memory instance;
   reading a value from the shared memory instance; and
   releasing the shared memory instance;
   means for simulating the circuit design by configuring the programmable logic with the DUT and driving a co-simulation engine to communicate with the DUT via execution of the sequence of scripting instructions that write to the port of the DUT and that read from and write to the shared memory instance; and
   means for outputting results of simulating the circuit design.

14. The apparatus of claim 13, wherein the means for implementing comprises:
   means for establishing a model of the circuit design using a high level modeling system (HLMS); and
   means for processing the model of the circuit design using a plurality of implementation tools for the programmable logic to generate a configuration stream for the DUT.

15. The apparatus of claim 14, wherein the sequence of scripting instructions accesses the API using an interface independent of the HLMS.

16. The apparatus of claim 14, wherein the sequence of scripting instructions is programmatically generated within the context of metadata generated by the HLMS.

17. The apparatus of claim 13, wherein the sequence of scripting instructions includes respective instructions that:
   create a hardware co-simulation instance;
   open a hardware co-simulation interface; and
   communicate data between the co-simulation engine and the DUT in the programmable logic.

* * * * *